(12) United States Patent
Lindgren (10) Patent No.: US 8,209,838 B2
(45) Date of Patent: Jul. 3, 2012

(54) REPAIRING COMPOSITE STRUCTURES

(75) Inventor: Lawrence S. Lindgren, Redmond, WA (US)

(73) Assignee: The Boeing Company, Chicago, IL (US)

( * ) Notice: Subject to any disclaimer, the term of this patent is extended or adjusted under 35 U.S.C. 154(b) by 735 days.

(21) Appl. No.: 12/340,481

(22) Filed: Dec. 19, 2008

(65) Prior Publication Data

US 2010/0161095 A1 Jun. 24, 2010

(51) Int. Cl.
*B23P 6/00* (2006.01)
*G06F 17/50* (2006.01)

(52) U.S. Cl. ...................... 29/402.12; 700/98
(58) Field of Classification Search ............... 29/402.12, 29/402.11, 402.09, 402.08, 402.01, 451, 29/700, 703; 700/98
See application file for complete search history.

(56) References Cited

U.S. PATENT DOCUMENTS

| | | | |
|---|---|---|---|
| 4,588,626 A | 5/1986 | Cologna et al. | |
| 4,793,879 A | 12/1988 | Mimbs | |
| 4,808,253 A | 2/1989 | Mimbs | |
| 4,820,564 A | 4/1989 | Cologna et al. | |
| 5,023,987 A | 6/1991 | Wuepper et al. | |
| 5,034,254 A | 7/1991 | Cologna et al. | |
| 5,369,736 A * | 11/1994 | Kato et al. | 345/582 |
| 5,561,526 A * | 10/1996 | Huber et al. | 356/604 |
| 5,665,913 A | 9/1997 | Chung | |
| 5,827,598 A | 10/1998 | Larsen et al. | |
| 5,841,031 A | 11/1998 | Chung | |
| 6,031,212 A | 2/2000 | Westerman et al. | |
| 6,149,749 A | 11/2000 | McBroom | |
| 6,174,391 B1 * | 1/2001 | Chen et al. | 149/19.92 |
| 6,174,392 B1 | 1/2001 | Reis | |
| 6,385,836 B1 | 5/2002 | Coltrin | |
| 6,561,247 B2 | 5/2003 | Chou et al. | |
| 6,656,299 B1 | 12/2003 | Grosskrueger et al. | |
| 6,758,924 B1 | 7/2004 | Guijt | |
| 6,761,783 B2 | 7/2004 | Keller et al. | |
| 2003/0188821 A1 | 10/2003 | Keller et al. | |
| 2005/0120635 A1 | 6/2005 | Tsetsorin | |
| 2007/0095457 A1 | 5/2007 | Keller et al. | |
| 2007/0289692 A1 | 12/2007 | Bogue et al. | |
| 2008/0233346 A1 | 9/2008 | Bogue et al. | |
| 2008/0281554 A1 | 11/2008 | Cork et al. | |
| 2008/0283172 A1 | 11/2008 | Bernus et al. | |

* cited by examiner

*Primary Examiner* — John C Hong
(74) *Attorney, Agent, or Firm* — Yee & Associates, P.C.

(57) ABSTRACT

The design for a repair of an area of a composite structure is at least partially automated. Electronic data defining the boundaries of the area is used to calculate the boundaries of a cutout in the composite structure encompassing the area. Components used to repair the area are automatically designed based on the location of the cutout. Following removal of the cutout, the repair components are installed.

24 Claims, 12 Drawing Sheets

REPAIRING COMPOSITE STRUCTURES

TECHNICAL FIELD

This disclosure generally relates to techniques used for repairing composite structures, and deals more particularly with a method and system for rapidly designing and analyzing large area repairs, especially for aircraft.

BACKGROUND

Composites structures used in a variety of applications sometimes require repair. For example, airplanes employing a composite fuselage may experience localized need for repair work under service conditions. When the repair area on the airplane is relatively small, the repair may be effected through bonding techniques in which a composite patch is bonded over the repair area of the skin. However, bonding techniques may result in the plies being built up beyond the normal skin thickness, thereby altering the cross sectional profile of the skin. Bonded repairs may also result in other variations that may be difficult to control on a repeatable basis. Moreover, as mentioned above, bonding techniques may not be suitable for repairing larger areas, such as, for example and without limitation, areas in a fuselage skin up to and larger than approximately 3 feet in breadth.

Repairs of a larger area on an airplane fuselage may involve cutting away an entire section of the fuselage, and may require replacing portions of interior stringers and/or frame members along with the outer skin. A large area repair of this type may require extensive engineering analysis in order to precisely determine the area of the fuselage surrounding the repair area that should be cut out. Further engineering may then be needed to design the required repair components. Additionally, the engineering and analysis of the repair may require knowledge of, and access to, a variety of engineering tools, each of which may have a unique user interface, database, visualization capabilities and operating system. Large area repairs of a composite fuselage, therefore, may be time consuming, labor intensive and require the involvement of multiple specialized experts.

Accordingly, there is a need for a method and system for performing large area repairs to composite structures, such as an airplane fuselage, that may be rapidly designed and installed, and which reduce dependence on multiple skilled personnel during design and installation.

SUMMARY

The disclosed embodiments integrate the design, analysis and manufacturing operations necessary to produce a large area custom repair for a composite fuselage. A repair may be required to correct an out-of-tolerance condition resulting from production processes, or to correct a condition that develops after the fuselage has been placed into service. In one embodiment, the design and analysis of a proposed repair may be performed at a central location, while fabrication and installation of the necessary repair components may be carried out at one or more remote locations.

The embodiments are particularly suitable for large area repairs that are bolted, rather than bonded onto the fuselage. The system rapidly maps the repair area using a laser tracker and generates electronic data representing the boundaries of the repair area in the coordinate system of the airplane. Using this electronic data, the system allows the user to choose the size and location of the cutout necessary to make the repairs, and to select the repair components. After designing a repair, the system uses a computer to analyze the repair and allows a user to make any appropriate changes. The system may automatically generate a fastener pattern for bolting the repair to the fuselage. The fastener pattern may be in the form of a data file that is transmitted to a laser device which projects the fastener pattern directly onto the fuselage.

One advantage of the disclosed embodiments resides in the fact that previously used and approved repairs can be used as templates that are electronically stored according to the location of the repair and later retrieved to make subsequent repairs, thus speeding the repair process. Another advantage of the disclosed embodiments resides in the ability of the user to modify certain design parameters for each type of repair so that the repair solution is optimized for a particular area of the fuselage. The disclosed embodiments may be at least partially automated through the use of integrated software which allows the user to perform necessary analysis of a proposed repair without having detailed knowledge of multiple user interfaces and software applications that may be required to carry out the analysis. Yet another advantage of the embodiments lies in the use of standardized specifications for manufacturing and installing the repair components, which can be stored and later retrieved for use in carrying out the same or similar repairs.

According to one disclosed method embodiment, an area in a composite structure is repaired. Electronic data defining the boundaries of the repair area is generated and used to calculate the boundaries of a cutout in the composite structure encompassing the repair area. The cutout is removed from the composite structure and a repair is designed for the repair area which includes designing components to replace those within the cutout. The components forming the repair are then installed in the cutout. In one embodiment, the electronic data defining the boundaries of the repair area is generated by using a laser or similar energy beam to select points along the boundaries of the repair area, and determining the 3D location of the selected points in a coordinate system of the composite structure. The boundaries of a cutout may be visually displayed on a 3D visual model of the composite structure.

According to another disclosed method embodiment, an area in a composite fuselage of an aircraft is repaired. Each of a plurality of points on the skin of the fuselage is located which generally outline the boundaries of the repair area in a coordinate system of the aircraft. The boundaries of a cutout in the fuselage required for the repair are then determined based on the locations of the selected points. A programmed computer is used to automatically design a set of repair components based on the boundaries of the cutout. The cutout is removed from the fuselage and the repair components are installed in the area of the cutout.

According to another embodiment, a system is provided for use in repairing an area in a composite body of a vehicle. Means are provided for generating electronic data defining boundaries of the repair area on a skin of the body. A computer including a software program calculates the boundaries of the cutout of the body encompassing the repair area using the electronic data and designs a set of repair components for installation in the cutout. The computer may include a graphical user interface and a screen display which includes a plurality of selectable repair components and selected values for each of the components used to repair the area.

The disclosed embodiments satisfy the need for a method and system for repairing a composite structure such as the fuselage of an aircraft which is rapid, at least partially automated and produces repeatable results

BRIEF DESCRIPTION OF THE ILLUSTRATIONS

DETAILED DESCRIPTION

Figure 1:
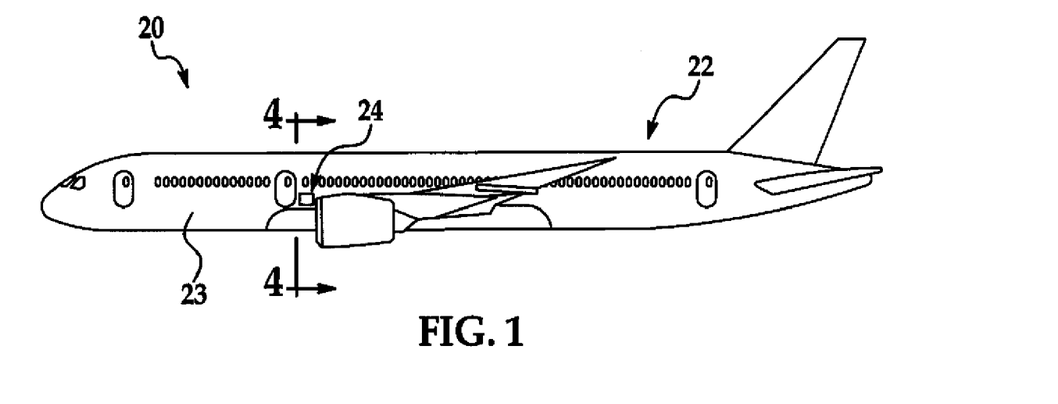
FIG. 1 is a side view of an airplane with a repair area in the fuselage.

Referring to FIG. 1, an airplane 20 includes a fuselage 22 having a laminated composite outer skin 23 formed, for example and without limitation of carbon fiber epoxy. The disclosed embodiments provide a method and system for repairing the fuselage 22, especially where the needed repair covers a relatively large area on the skin 23. In the illustrated example, a repair area of the skin 23 is generally indicated by the numeral 24. The disclosed repair method and system are intended to effect repairs that result in the repaired fuselage 22 being as strong as or stronger than the original fuselage 22.

Figure 2:
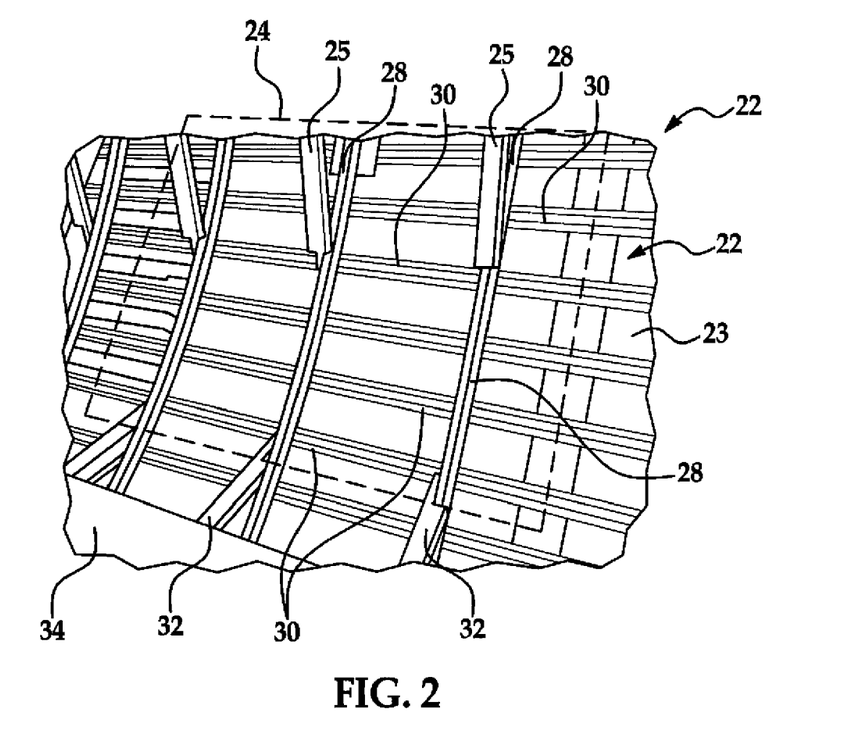
FIG. 2 is a perspective view from inside the fuselage of the aircraft shown in FIG. 1, illustrating components of the fuselage.

FIG. 2 illustrates the interior side of the fuselage 22, wherein the repair area is indicated within the broken line 24. The fuselage skin 23 is reinforced by barrel shaped frames 28 and longitudinally extending stringers 30, both of which may be formed from composite materials. Beams 32 supporting a floor 34 are be attached to the frames 28. Stanchions 25 may also be attached to the frames 28. Depending upon the location and extent of the repair area 24, one or more of the frames 28, stringers 30, stanchions 25 or beams 32 may have a repair area along with the skin 23.

Figure 3:
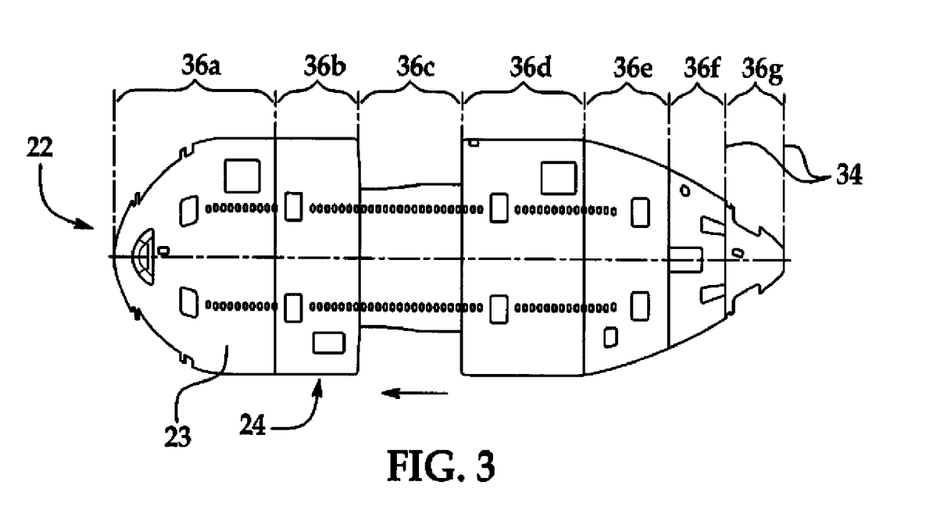
FIG. 3 is a cylindrical projection of the fuselage, and indicating the general area requiring repair.
Figure 4:
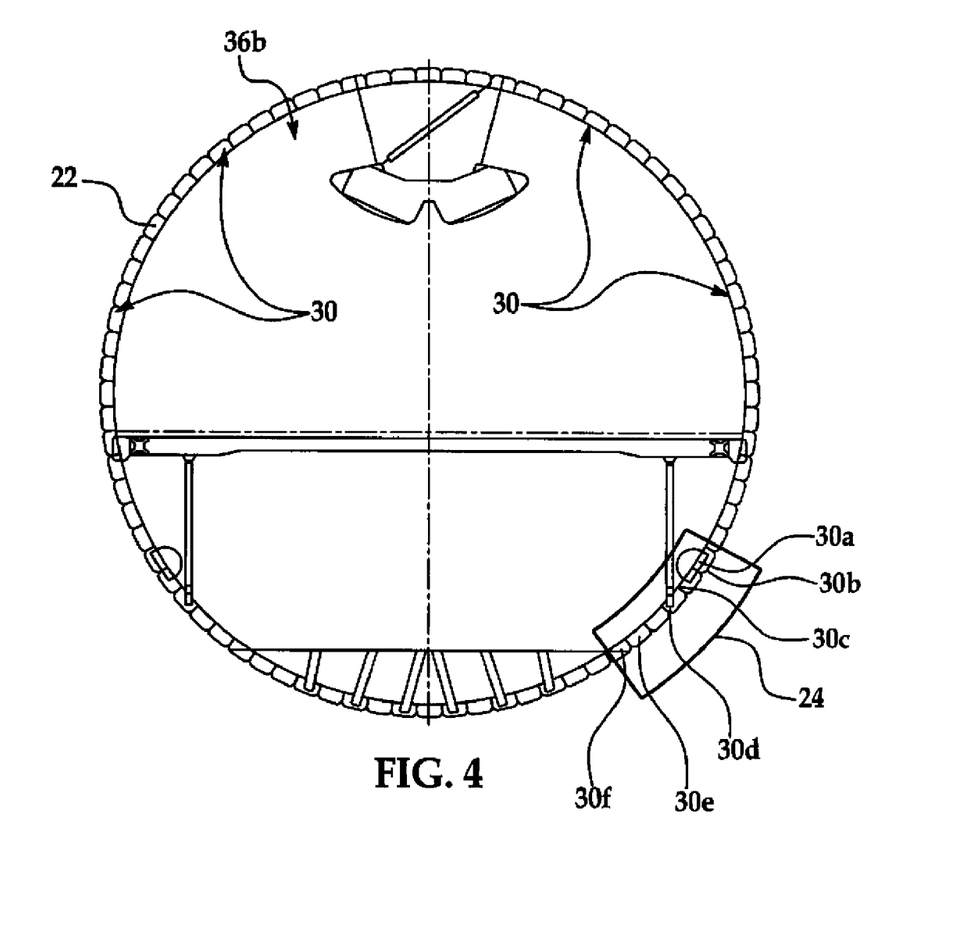
FIG. 4 is a sectional view taken along the line 4-4 in FIG. 1, and showing the repair area.

Referring now to FIGS. 3 and 4, the location of the repair area 24 on the fuselage 22 may be defined in terms of the longitudinal location of the frames 28 and the circumferential location of the stringers 30. For example, in FIG. 3 the length of the fuselage 22 may be divided into sections 36a-36g which may encompass one or more of the frames 28. In the illustrated example, the repair area 24 is located within longitudinal section 36b, and as shown in FIG. 3, the repair area 24 can be seen to extend between stringers 30a and 30f. The stringers 30 and frames 28 form a grid-like pattern defining bays 27 that may be used to assist in defining the area 24 requiring repair, as well as to define the location of a cut-out (not shown) that may be removed from the fuselage 22 to complete the repair.

Figure 5:
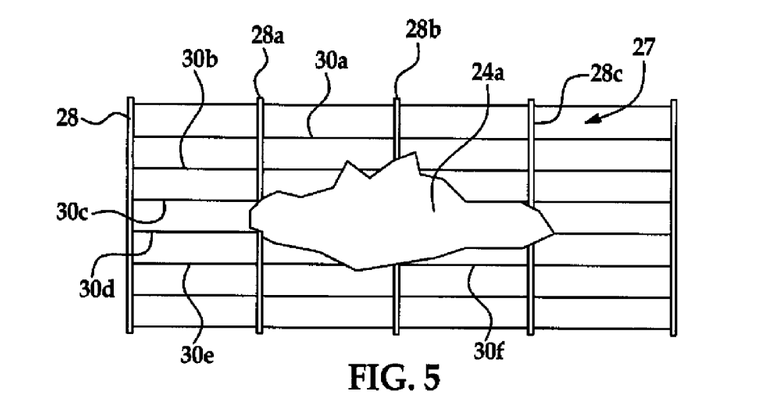
FIG. 5 is a diagram illustrating the boundaries of the repair area relative to a projection of the frames and stringers of the fuselage.

FIG. 5 illustrates the boundaries 24a of the repair area 24 superimposed on a cylindrical projection of the frames 28 and stringers 30. From FIG. 5, it can be seen that the boundaries 24a of the repair area 24 span three of the frames 28a, 28b, 28c and six of the stringers 30a, 30b, 30c, 30d, 30e, 30f.

Figure 6:
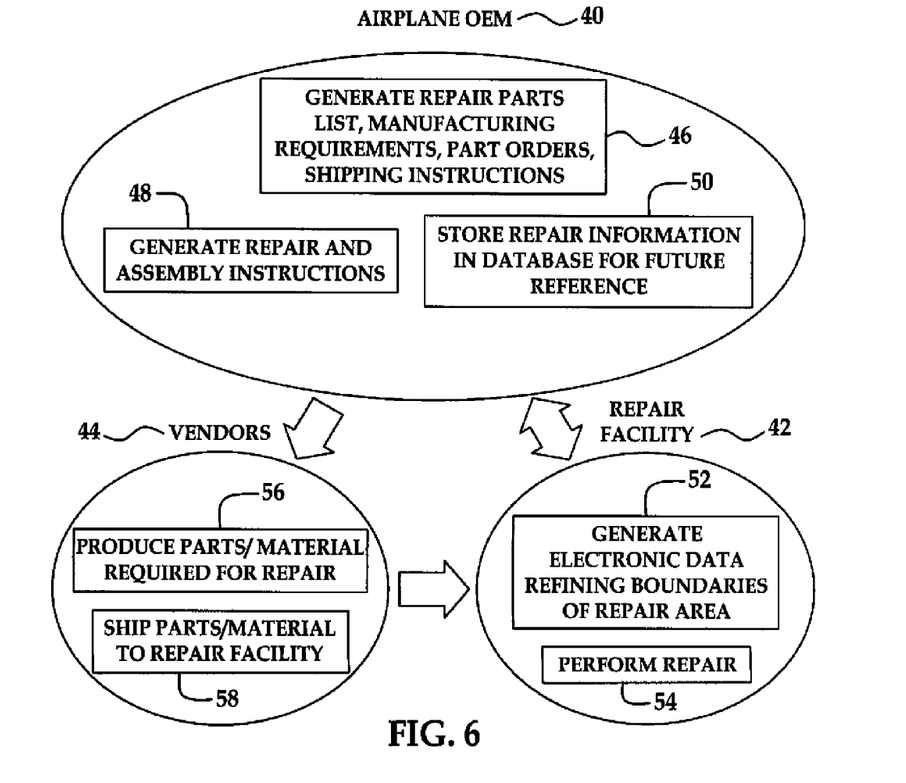
FIG. 6 is a diagram illustrating the relationship between an airplane OEM, vendors and a repair facility.

Referring to FIG. 6, the disclosed embodiments provide a method and system for repairing the area 24 in the fuselage 22. In one embodiment, the various tasks involved in repairing the area 24 may be performed by an airplane OEM (original equipment manufacturer) 40, a repair facility 42 and vendors 44. The repair facility 42 may be operated by, for example and without limitation, maintenance and repair organizations that provide maintenance services to aircraft owners and/or operators. Alternatively, the repair facility 42 may be operated directly by the aircraft owner and/or operator. The repair facility determines the boundaries 24a of the repair area 24 by generating electronic data defining the boundaries of the repair area, as shown at 52. The repair facility 42 may also perform the repair 54.

The airplane OEM 40 may generate a repair component list, manufacturing requirements, part orders, and shipping instructions related to the repair. In some cases, the airplane OEM 40 may provide or fabricate repair components while in other cases, orders are transmitted electronically to vendors 44 who produce parts/materials required for the repair as shown at 56, and then ship the part/materials to the repair facility, as shown at 58. The airplane OEM 40 may also generate repair and assembly instructions at 48 which may be transmitted electronically to the repair facility and used by personnel to perform the repair 54. The airplane OEM 40 may store repair information at 50 in databases for future reference. The venders 44 ship components, parts and/or materials to the repair facility based on the shipping instructions received from the airplane OEM 40.

Figure 7:
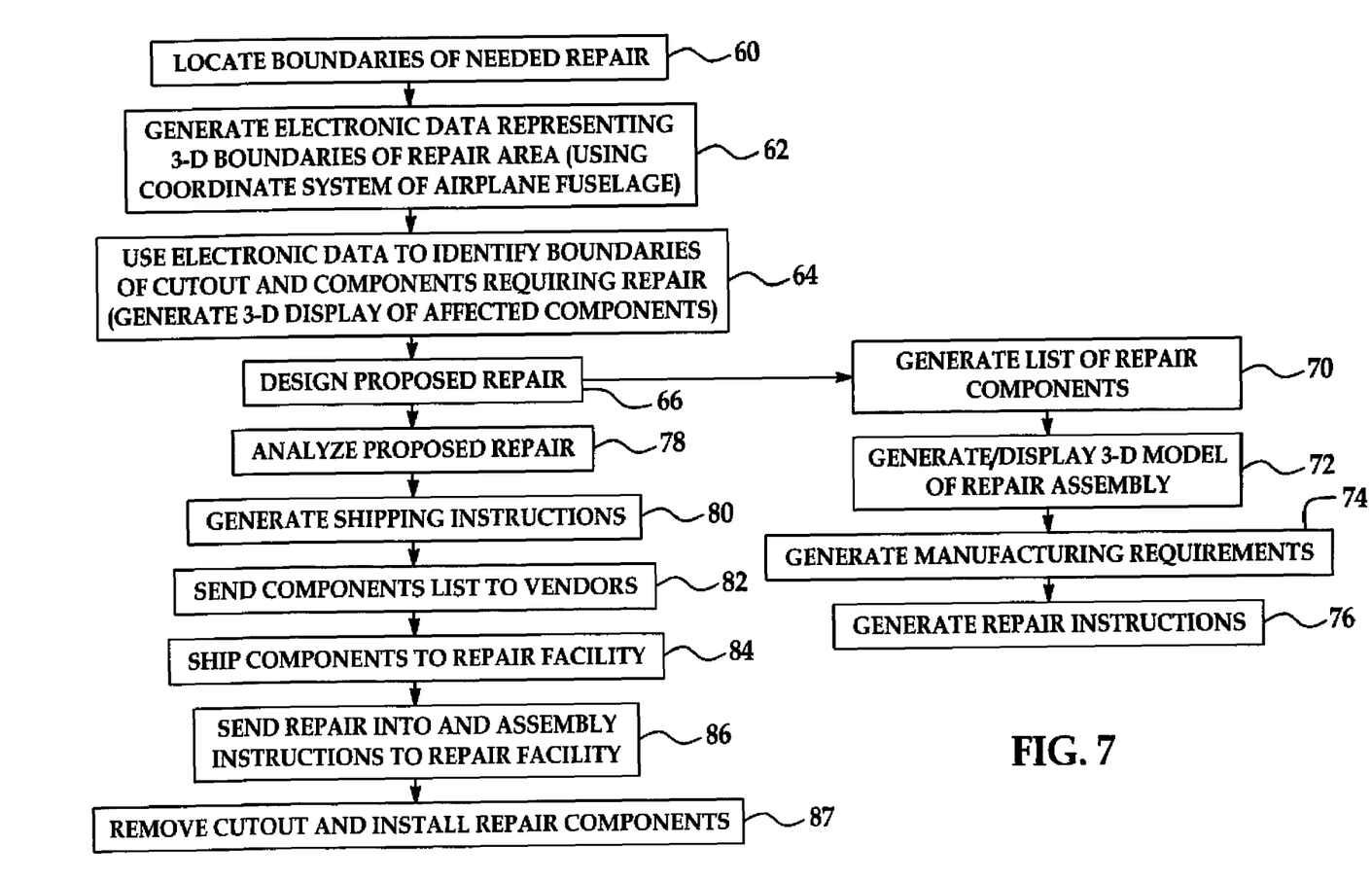
FIG. 7 is a high level flow diagram illustrating a method for repairing an area of an airplane fuselage.

Attention is now directed to FIG. 7 which broadly illustrates the steps of the method for repairing a composite structure, such as the fuselage 22 described above. Beginning at 60, the boundaries 24a (FIG. 5) of the repair area 24 are approximately located using, for example and without limitation, laser tracking techniques as will be discussed later in more detail. At 62, electronic boundary data is generated which represents the boundaries 24a located at step 60 within the coordinate system 82 (FIG. 8) of the fuselage 22. Next, at 64, the electronic data representing the boundaries 24a generated at 62 is used to identify the boundaries of a cutout in the fuselage 22, and to identify the affected components requiring repair or replacement. Step 64 may include generating a three dimensional visual model 140 (FIGS. 13a and 14) of the affected components using a later discussed graphical user interface (GUI) 88 (see FIG. 8), in which the boundaries of the cutout are displayed on the visual model. Based on user selections, a proposed repair is then designed at step 66. Designing the repair may involve generating a list of repair components at 70, generating and displaying a 3D model of the repair assembly at 72, generating manufacturing requirements at 74 and generating repair instructions at 76.

A proposed repair having been designed, the proposed repair may then be automatically analyzed at step 78. When a user has determined that the proposed repair is satisfactory, shipping instructions are automatically generated at step 80 which are provided to the vendors 44, and which direct the vendors to ship the repair components directly to the repair facility 42 (FIG. 6). At 82, the airplane OEM 40 sends the list of repair components to the vendors 44. At step 86, the airplane OEM 40 and/or the vendors 44 ship the repair components to the repair facility 42. At step 86, the airplane OEM 40 sends the repair information and assembly instructions to the repair facility 42. Finally, at step 87, the repair facility 42 performs the repair by removing the cutout and installing the repair components. The removal of the cutout may involve removal of a portion of the skin 23 as well as removal of structural components that may be attached to the skin 23. In some cases, these structural components may extend beyond the area of the cutout.

Figure 8:
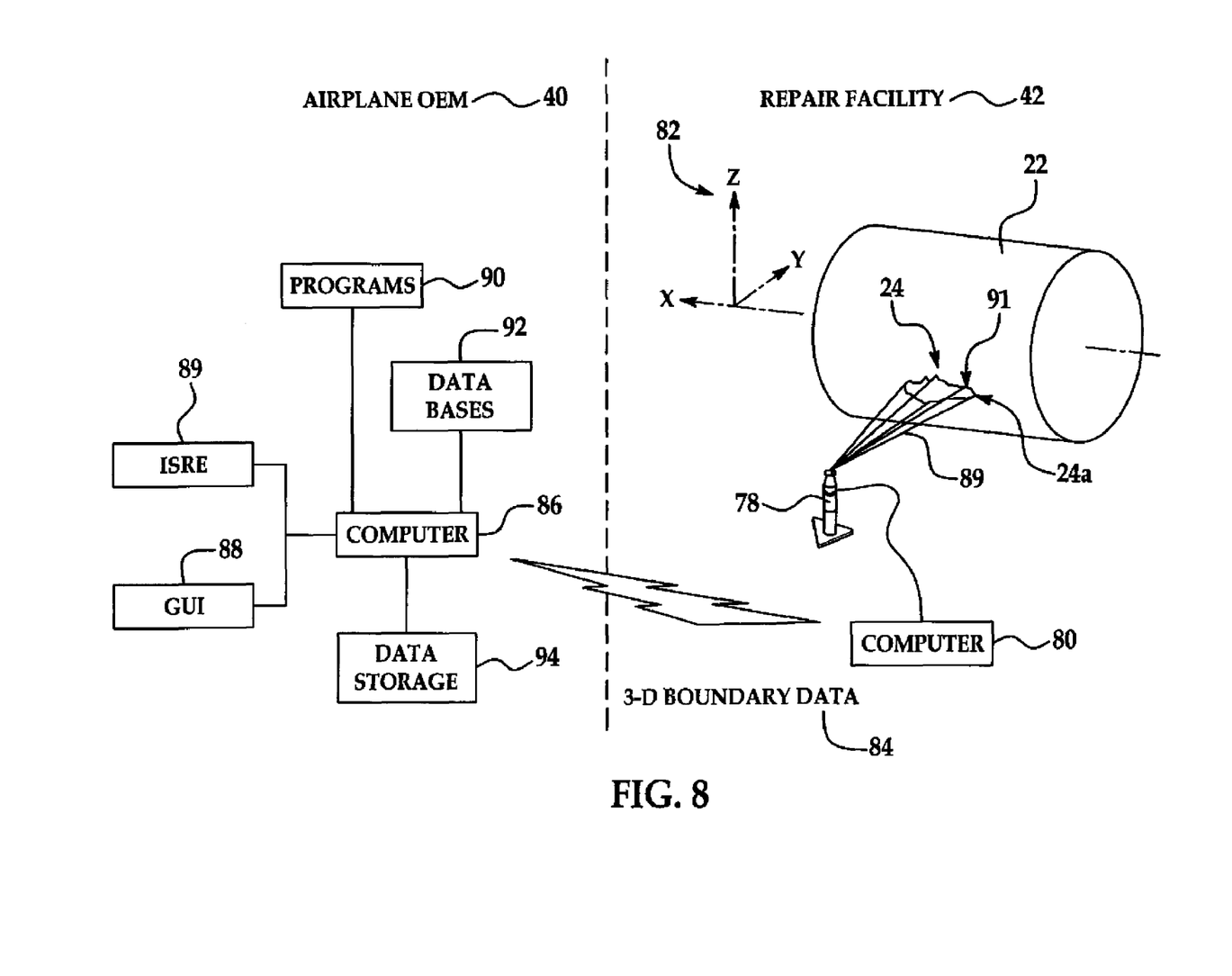
FIG. 8 is a combined block and diagrammatic illustration showing the functions performed by the airplane OEM and a repair facility.

Referring now to FIG. 8, personnel at the repair facility 42 may determine the general boundaries 24a of the repair area 24 using an energy beam, which may be a laser beam 89 produced by a commercially available laser tracker 78. The laser tracker 78 projects the laser beam 89 onto each of a series of selected points 91 along the boundary 24a. The laser tracker 78 may be coupled with a computer 80 that measures the location of each of the points 91 in an orthogonal coordinate system 82 of the airplane 20, and particularly that of the fuselage 22, and converts the location of each of the points 91 into a set of electronic boundary data 84 representing the 3-D location of the selected points 91. The electronic boundary data 84 may be transmitted electronically to the airplane OEM 40. The number of points 91 that are measured will vary depending on the size and location of the repair area 24, but generally, the number of points 91 need only be great enough to establish the approximate outer boundaries 24a of the repair area 24. Other techniques for locating the boundaries 24a of the repair area 24 may be possible, such as for example and without limitation, photogrammetry.

A computer 86, at the airplane OEM 40, may have access to a variety of operating system and application programs 90, as well as databases 92. For example, the databases 92 may include three dimensional CAD models of various portions of the fuselage 22 which, as will be discussed below, may be used in identifying the repair components. The computer 86 employs Integrated Structural Repair Environment (ISRE) application software 89 to design and analyze a repair that follows the contour of the stringers and frames, rather than that of the points 91. A graphical user interface (GUI) 88 allows a user to interface with both the computer 86 and screen displays produced by ISRE 89. Data storage 94 is provided for storing a variety of information, including information relating to previously made and approved repairs.

Figure 9:
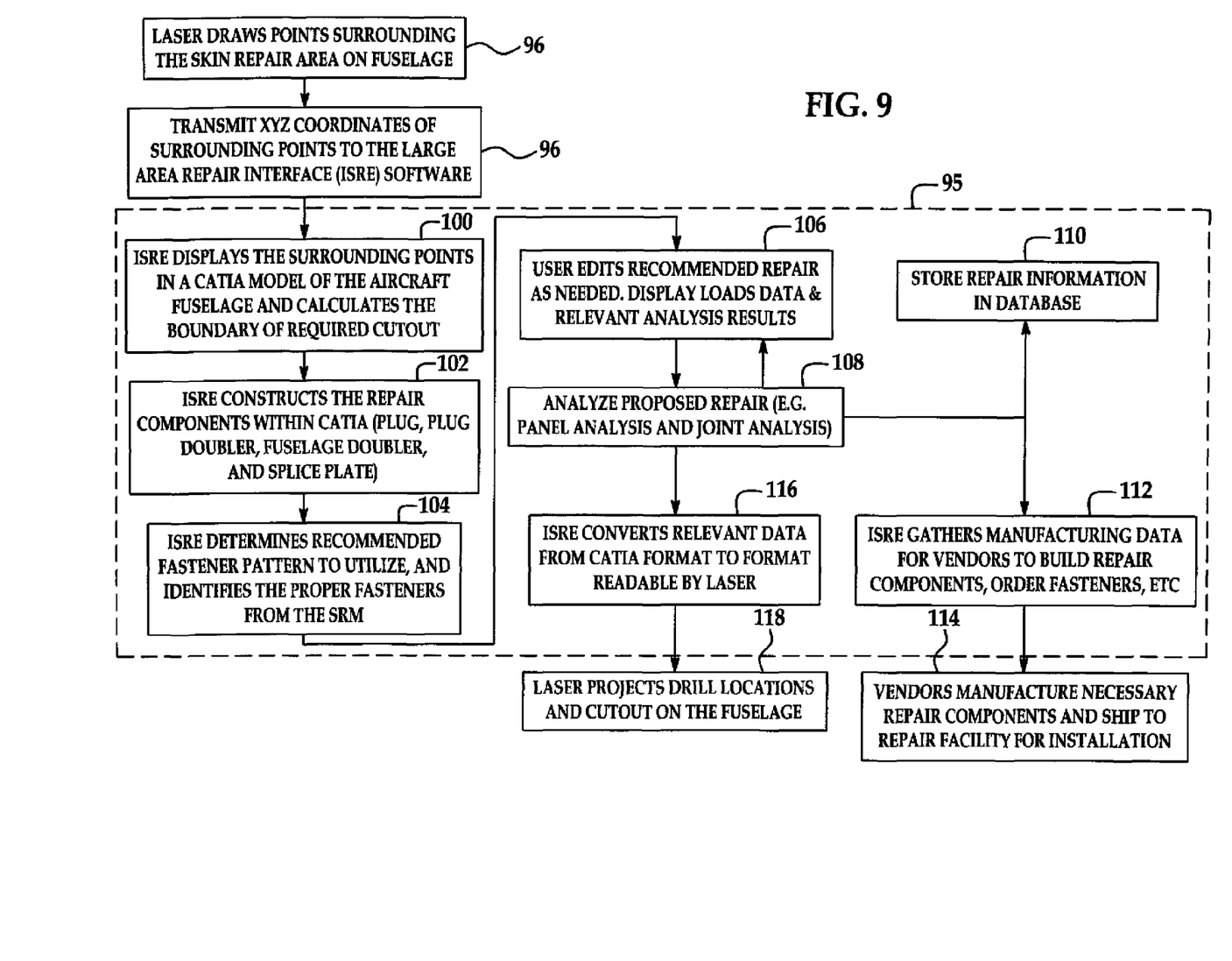
FIG. 9 is a flow diagram illustrating additional details of the method embodiment.

Attention is now directed to FIG. 9 which illustrates additional details of the repair method, and particularly a series of functions performed by ISRE 89 which are generally indicated within the broken line 95. Beginning at 96, the laser tracker 78 (FIG. 8) draws a set of points 91 on the fuselage 22 generally encompassing the area 24 needing repair. At 98, the computer 80 at the repair facility 42 transmits the x, y, z coordinates of each of the points 91 to the ISRE program 89 at the airplane OEM 40. At step 100, the ISRE 89 software displays the surrounding points 91 on a 3D CAD model of the aircraft fuselage 22 and calculates the boundaries of a required cutout 142 (see FIG. 14) in the fuselage 22; the cutout 142 may also be displayed on the 3D CAD model of the aircraft fuselage 22. The boundaries of the cutout 142 are calculated by converting the boundaries 24a of the repair area 24 into a coordinate system of the 3D CAD model, and using the converted coordinates to locate the boundaries 24a on the 3D CAD model. Next, at 102, the ISRE 89 program designs the repair components within the 3D model which may comprise, for example and without limitation, a plug 126, a plug doubler 128, a fuselage doubler 124 and a splice plate 130, all shown in FIGS. 10 and 11.

Next, at step 104, the ISRE program 89 determines the recommended fastener pattern to use in making the repair and identifies the proper type of fasteners based on engineering standards. The ISRE program 89 may also determine the number, edge distance, spacing, etc. of the fasteners. At 106, a user may edit the recommended repair, as required. For example, the user may modify cutout boundaries, corner radius and/or remove individual fasteners, change the type of fasteners, or alter the thickness of the components. The GUI 88 then displays the load data and relative analysis results. At this point, the proposed design may be subjected to any of various types of analysis to determine whether any design changes are required. Thus, in step 108, an analysis is performed of the proposed repair, which may include, without limitation, a panel analysis or a joint analysis.

Once the analysis is complete and the user is satisfied with the results, the repair information, which may include repair geometry, fastener information, analysis results, the conditions resulting in the need for the repair, airplane identification information, etc. is stored in a database 92 (FIG. 8) for future reference. As shown in 112, the ISRE program 89 then gathers manufacturing data for one or more vendors 44 in order to allow the vendors 44 to build the repair components, order fasteners, etc. The ISRE program 89 also provides the vendors 44 with manufacturing requirements and shipping information so that the vendors 44 can ship the repair components to the repair facility 42. As shown at 114, the vendors 44 then manufacture the necessary repair components and ship these components to the repair facility 44 for installation.

Figure 12:
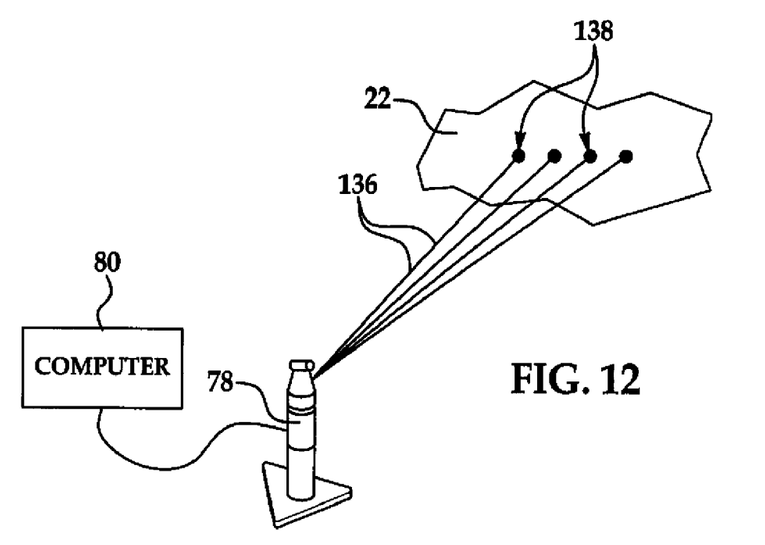
FIG. 12 is a combined block and diagrammatic illustration of a fastener pattern being projected onto the skin of the airplane.

Following successful analysis performed at 108, the ISRE program 89 converts data from the 3D CAD model format to a format that may be read by the laser tracker 78. This data includes the 3D point data defining the size and location of the cutout (not shown) along with the location of each fastener hole (not shown) to be drilled in the skin 23. At 118, the laser 78 uses the 3D location data to project beams 136 onto the fuselage skin 22 at points 138 corresponding to fastener locations and/or cutout areas, as best seen in FIG. 12.

Figure 10:
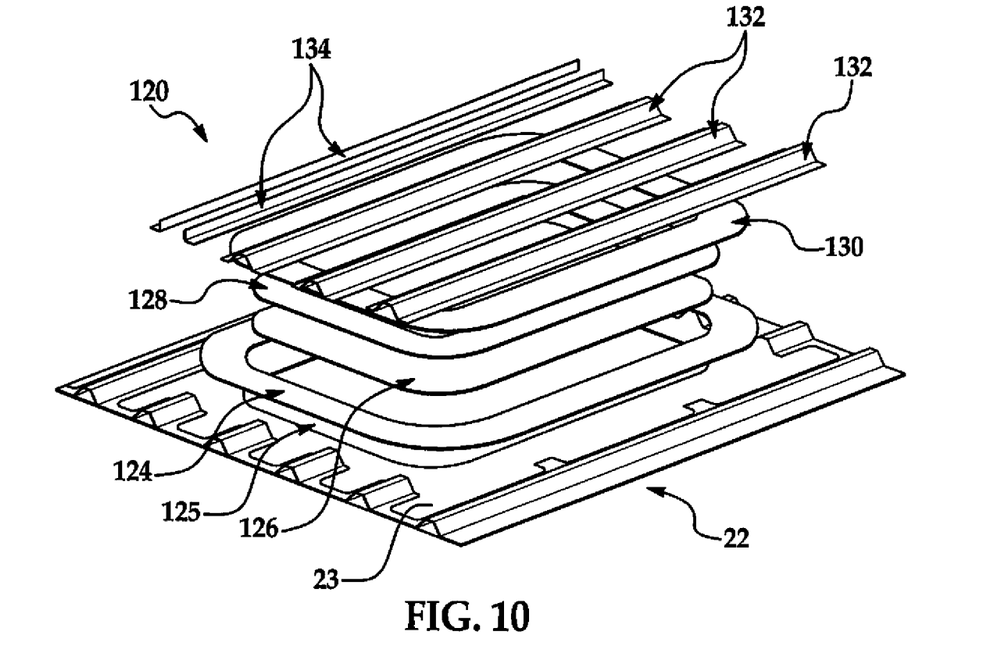
FIG. 10 is an exploded, perspective illustration of repair components relative to a fuselage skin.
Figure 11:
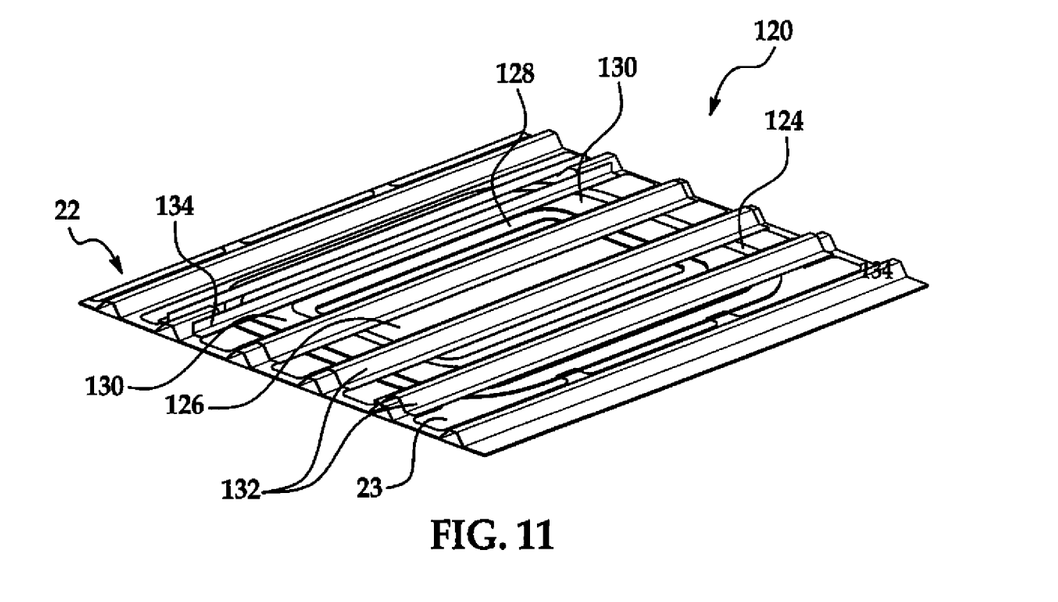
FIG. 11 is a view similar to FIG. 10 but showing the components having been installed.

FIGS. 10 and 11 illustrate the components of a typical repair for a fuselage 22. A cutout 125 is formed in the skin 23 in preparation for installation of the repair components. The repair components may include for example and without limitation, a fuselage doubler 124, a skin plug 126, a plug doubler 128, a splice plate 130, hat splices 132, a spice plate 133 and optionally, angle stiffeners 134.

Figure 13A:
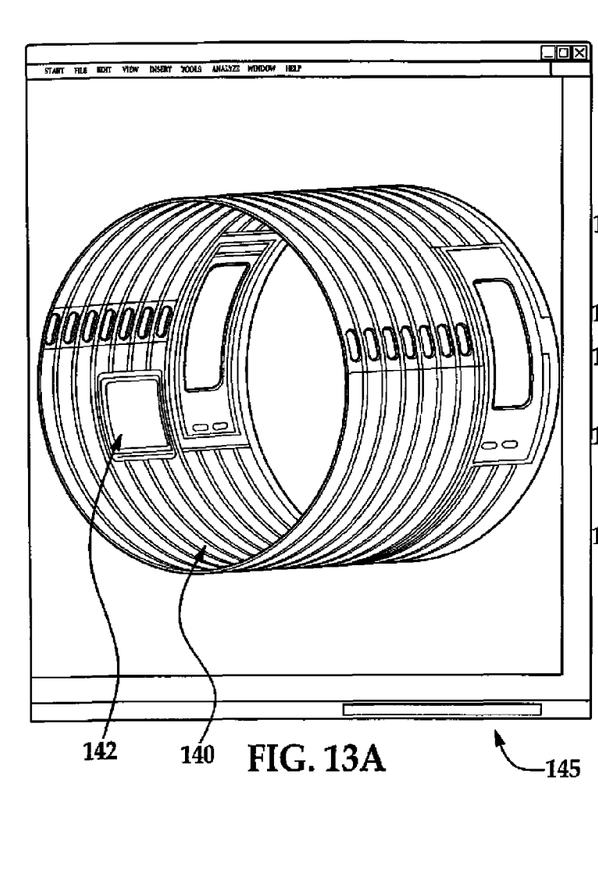
FIGS. 13-16 are views of display screens generated by the software used for designing the repair components and analyzing repairs.
Figure 13B:
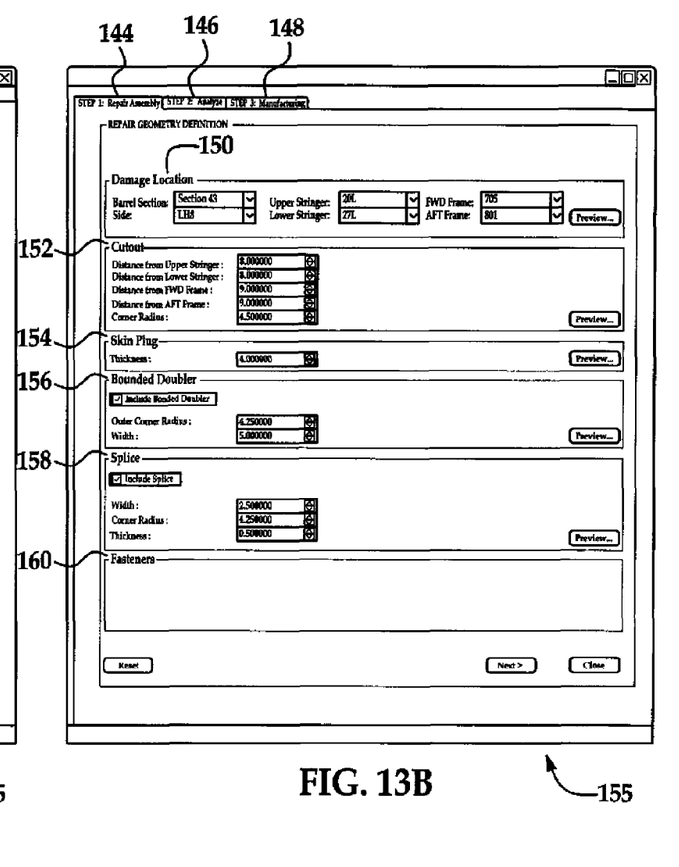
Figure 14:
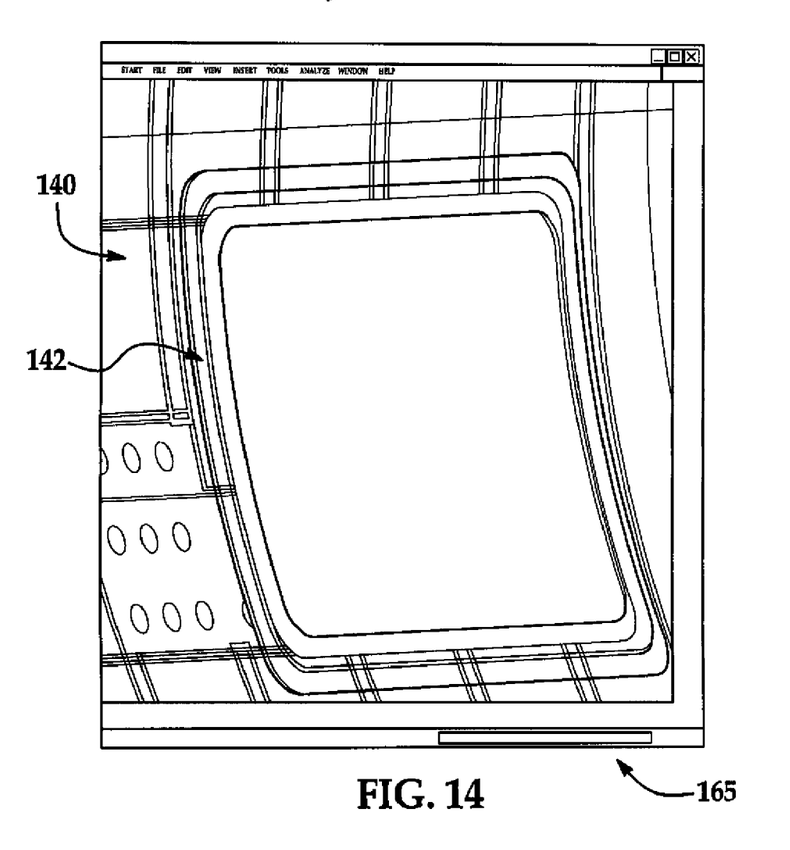

FIG. 13a is a typical 3D screen display 145 of a 3D model 140 of a section of the fuselage 20 illustrating the repair 142 which is generated by the ISRE program 89 using the GUI 88. FIG. 13b illustrates a screen display produced by the ISRE program 89 in which a series of user selectable parameters are displayed. FIG. 13b is a screen display 155 representing a repair assembly worksheet 144 forming the first step in the repair design process. Second and third steps are shown as an analysis tab 146 and a manufacturing tab 148 which may be selected by the user once the repair has been designed. The parameters that may be selected by the user as part of the repair assembly 144 may include, for example and without limitation, the location 150 needing repair, cutout information 152 which may include the size and location of the cutout 142, the thickness of a skin plug 154, the radius and width of a bonded doubler 156, dimensions of a splice at 158 and the type of fasteners to be used, shown at 160. FIG. 14 is another screen display 165 of a 3D visual model 140 of the repair 142.

Figure 15:
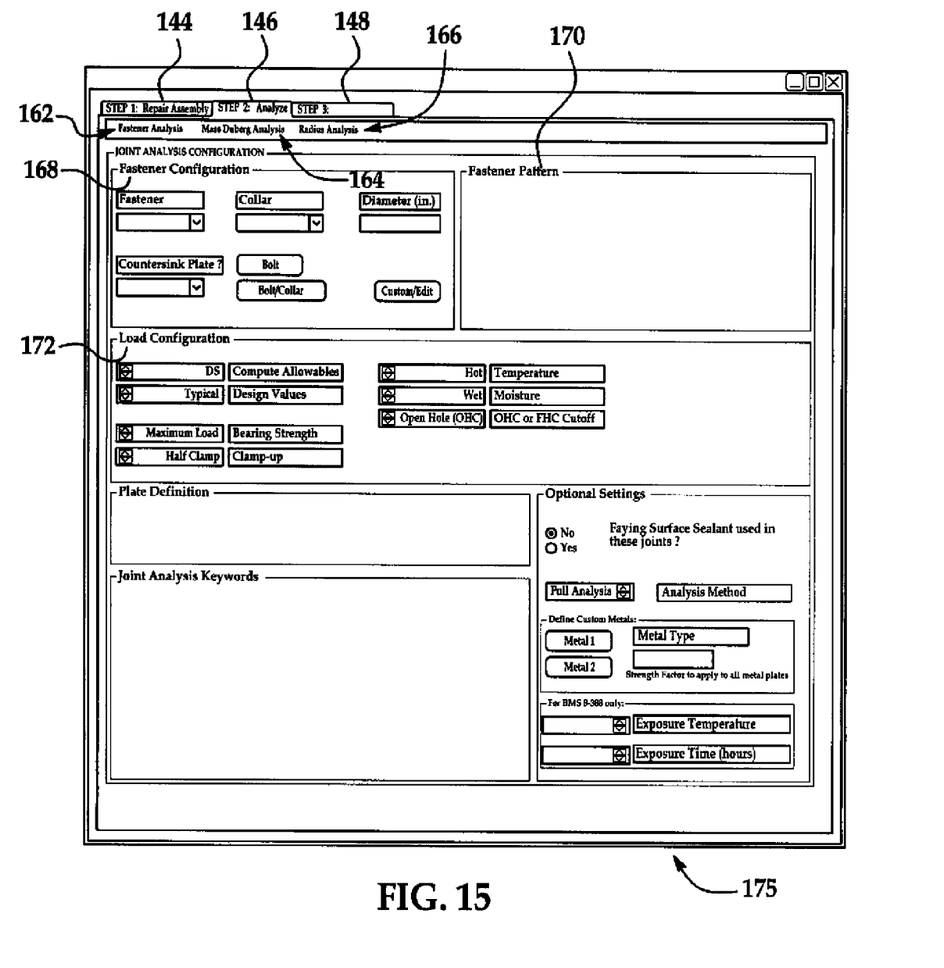

FIG. 15 illustrates a screen display 175 used in selecting the type and conditions of an analysis 146 of the proposed repair. For example, the analysis may be a fastener analysis 162, a Moss Duberg analysis 164 or a Radius analysis 166. As a part of the analysis, a user may select various assumptions and parameters used in the analysis. For example, in a joint analysis, the user may select various parameters related to the fastener configuration 168, fastener pattern 170 and load configuration 172.

Figure 16:
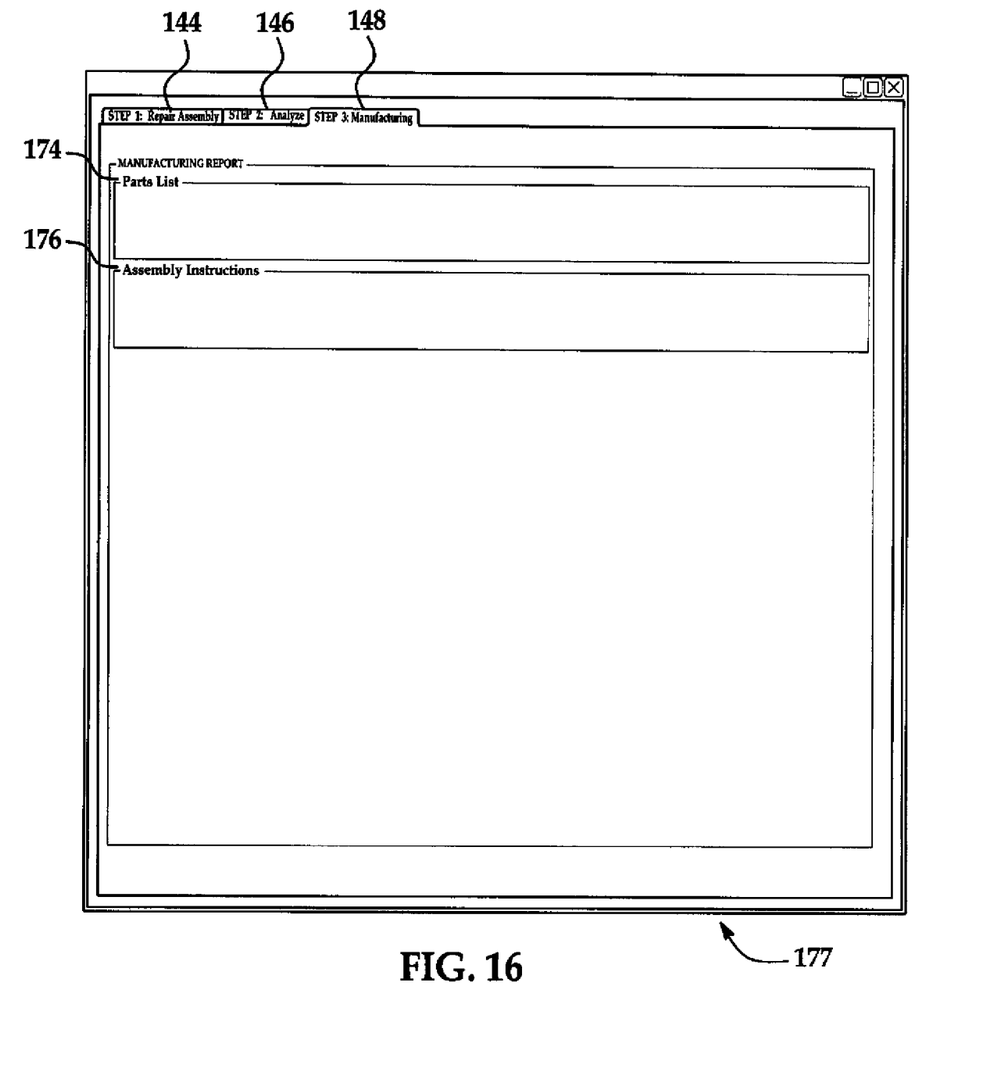

FIG. 16 illustrates a screen display 177 in which a user may input and record information used in manufacturing and/or installing a repair, such as, by way of example and without limitation, a parts list 174 and assembly instructions 176.

Figure 17:
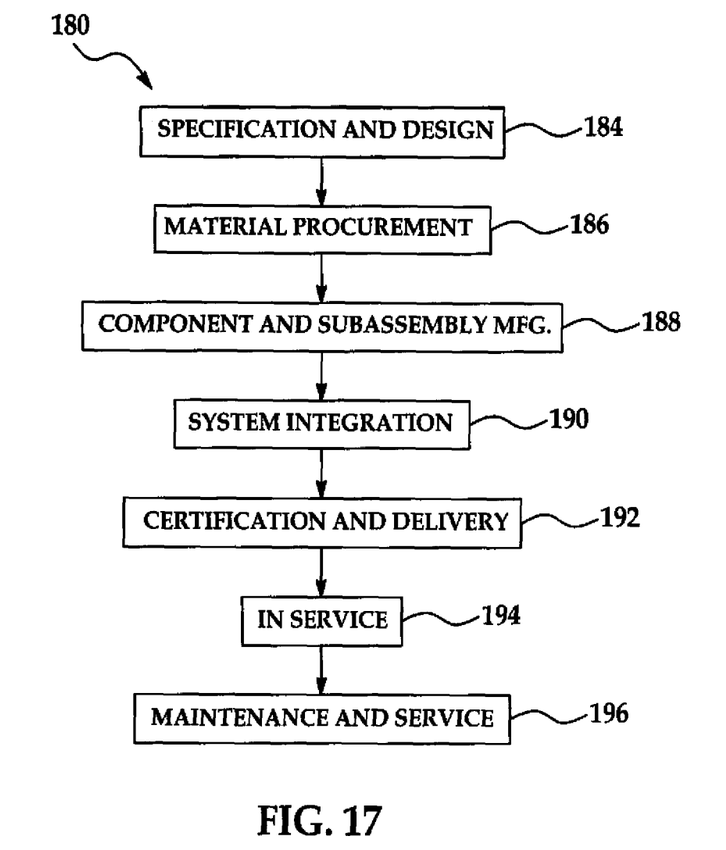
FIG. 17 is a flow diagram of aircraft production and service methodology.
Figure 18:
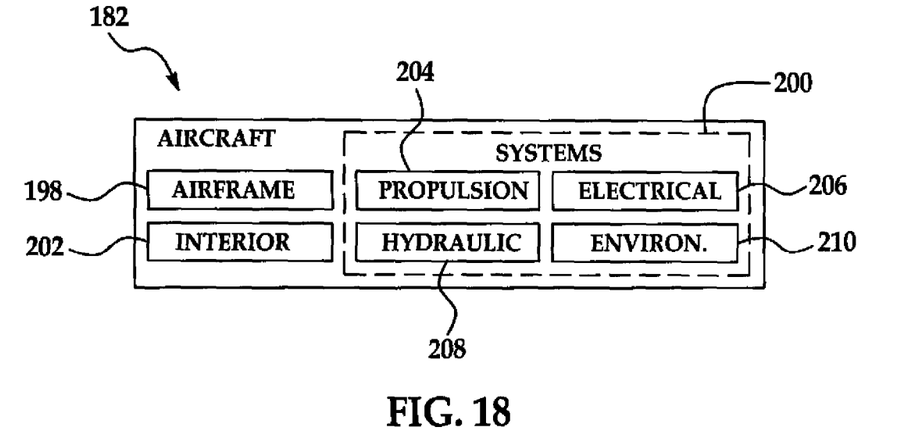
FIG. 18 is a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 180 as shown in FIG. 17 and an aircraft 182 as shown in FIG. 18. During pre-production, exemplary method 180 may include specification and design 184 of the aircraft 182 and material procurement 186. During production, component and subassembly manufacturing 188 and system integration 190 of the aircraft 182 takes place. Thereafter, the aircraft 182 may go through certification and delivery 192 in order to be placed in service 194. While in service by a customer, the aircraft 182 is scheduled for routine maintenance and service 196 (which may also include modification, reconfiguration, refurbishment, and so on).

Each of the processes of method 180 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 182 produced by exemplary method 180 may include an airframe 198 with a plurality of systems 200 and an interior 202. Examples of high-level systems 200 include one or more of a propulsion system 204, an electrical system 206, a hydraulic system 208, and an environmental system 210. Any number of other systems may be included. Although an aerospace example is shown, the principles of the disclosure may be applied to other industries, such as the marine and automotive industries.

Systems and methods embodied herein may be employed during any one or more of the stages of the production and service method 180. For example, components or subassemblies corresponding to production process 180 may be fabricated or manufactured in a manner similar to components or subassemblies produced while the aircraft 182 is in service. Also, one or more apparatus embodiments, method embodiments, or a combination thereof may be utilized during the production stages 188 and 190, for example, by substantially expediting assembly of or reducing the cost of an aircraft 182. Similarly, one or more of apparatus embodiments, method embodiments, or a combination thereof may be utilized while the aircraft 182 is in service, for example and without limitation, to maintenance and service 196.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of repairing an area in a composite structure, the method comprising:

generating electronic data defining first boundaries of the area;

using the electronic data to calculate second boundaries of a cutout in the composite structure encompassing the area;

removing the cutout from the composite structure;

designing a repair for the area, including designing a component to restore the composite structure within the cutout; and, installing the component within the cutout.

2. The method of claim 1, wherein generating the electronic data includes:

using an energy beam to select points along the first boundaries of the area, and determining corresponding 3-D locations of the points in a coordinate system of the composite structure.

3. The method of claim 1, further comprising:

electronically generating a visual model of the composite structure; and displaying the second boundaries of the cutout on the visual model.

4. The method of claim 1, wherein designing the repair includes:

generating at least a first computer graphics display of a plurality of selectable repair components and selectable values for each of the plurality of selectable repair components, and using the computer graphics display to select the component and a value for the component.

5. The method of claim 4, further comprising:

using a computer to perform an analysis of the repair based on the component and the value.

6. The method of claim 5, further comprising:

generating a second computer graphics display of a plurality of selectable types of analyses and selectable conditions the selectable types of analyses, using the second computer graphics display to select at least one analysis to be performed and conditions for the at least one analysis.

7. The method of claim 1, wherein designing the repair includes using a programmed computer to generate a pattern of fasteners used to install the repair on the composite structure.

8. The method of claim 7, wherein generating the pattern includes generating a set of electronic data defining corresponding 3-D locations of the fasteners in the pattern in a coordinate system of the composite structure, wherein the method further includes:

projecting the pattern onto the composite structure.

9. The method of claim 1, further comprising:

using a programmed computer to generate and send an order to at least one vendor for the component.

10. A method of repairing an area in a composite fuselage of an aircraft, comprising:

locating first boundaries of the area in a coordinate system of the aircraft;

determining second boundaries of a cutout in the composite fuselage to be used for the repair:

using a programmed computer to automatically design a set of repair components based on the second boundaries of the cutout;

removing the cutout from the composite fuselage; and, installing the set of repair components in the repair area.

11. The method of claim 10, wherein:

removing the cutout includes removing a section of skin of the composite fuselage and removing a structural component attached to the skin, and locating the first boundaries of the area includes locating each of a plurality of points on the skin of the composite fuselage, wherein the plurality of points indicate an outline of the first boundaries of the area.

12. The method of claim 11, wherein determining the second boundaries of the cutout is based on the plurality of points, and includes determining a location of the structural component attached to the skin in the area.

13. The method of claim 10, wherein:
determining the second boundaries of the cutout includes identifying frame members and stingers attached to a skin of the composite fuselage in the area, and removing the cutout includes removing at least portions of identified stringers and frames.

14. The method of claim 10, wherein automatically designing the set of repair components includes identifying parameters related to a set of fasteners used to fasten the set of repair components to the composite fuselage.

15. The method of claim 14, wherein installing the set of repair components includes:
generating a fastener pattern, and using a laser to project the fastener pattern onto a skin of the composite fuselage.

16. The method of claim 10, wherein determining the second boundaries of the cutout includes:
retrieving a model of the composite fuselage, converting coordinates of located points defining the first boundaries of the area into a coordinate system of the model, and using converted coordinates of the located points to locate the first boundaries of the area on the model.

17. The method of claim 11, wherein locating the plurality of points includes:
projecting a laser beam onto the plurality of points on the skin of the composite fuselage, and determining corresponding locations of the plurality of points on the skin within the coordinate system of the aircraft.

18. A system used in repairing an area in a composite body of a vehicle, comprising:
means for generating electronic data defining first boundaries of an area on a skin of the composite body; and,
a computer including a software program configured to calculate second boundaries of a cutout in the composite body encompassing the area using the electronic data, and for designing a set of repair components for installation in the cutout.

19. The system of claim 18, wherein;
the computer includes a graphical user interface (GUI), and a screen display produced by the software program and displayed by the GUI, the screen display including a plurality of selectable repair components and selectable values for each of the plurality of selectable repair components.

20. The system of claim 19, wherein the screen display includes a plurality of selectable types of analyses and selectable conditions for the plurality of selectable types of analyses.

21. The system of claim 18, wherein the means for generating the electronic data includes means for projecting a beam onto a surface of the composite body.

22. The system of claim 18, further comprising:
means for projecting a fastener pattern onto a surface of the body.

23. A system used in repairing an area in a fuselage of an aircraft, comprising:
a laser device configured to locate a plurality of points on a skin of the fuselage, the plurality of points indicating first boundaries of the area in a 3-D coordinate system of the aircraft;
a database including a 3-D model of the fuselage;
a computer coupled with the database, wherein the computer is configured to convert the location of the points on the skin into the coordinate system of the model and to determine second boundaries of a cutout in the fuselage required to repair the area;
a graphical user interface coupled with the computer, wherein the graphical user interface is configured to display first boundaries of the area on the model and to produce a screen display including a plurality of selectable repair components and selectable values for each of the plurality of selectable repair components;
a software program used by the computer to design repair components for the area based on the second boundaries of the cutout, and to produce a pattern of fasteners used to fasten the repair components to the fuselage; and
a laser device configured to project the fastener pattern onto a surface of the skin.

24. A method of repairing an area in a composite fuselage of an aircraft, comprising:
using a laser to locate each of a plurality of points on a skin of the composite fuselage, wherein the plurality of points indicate first boundaries of the area in a 3-D coordinate system of the aircraft;
generating a display of a model of the composite fuselage showing the first boundaries of the area relative to frame members and stringers in the area;
determining second boundaries of a cutout in the composite fuselage required for the repair based on the plurality of points;
generating a display of a model of the composite fuselage showing the second boundaries of the cutout relative to the frame members and the stringers in the area;
using a programmed computer to automatically design a set of repair components based on the second boundaries of the cutout, including to generate a first screen display of a plurality of selectable repair components and selectable values for each of the plurality of selectable repair components used to repair the area, and to generate a second screen display of selectable types of analyses and selectable conditions for each of the selectable types of analyses;
fabricating the set of repair components; and
installing the set of repair components in the area of the cutout.

* * * * *